United States Patent
O'Leary et al.

(10) Patent No.: US 9,592,568 B2
(45) Date of Patent: Mar. 14, 2017

(54) SUBSEA WELDING APPARATUS AND METHOD

(71) Applicant: Proserv UK Ltd., Westhill, Aberdeenshire (GB)

(72) Inventors: Adam James O'Leary, Aberdeen (GB); David Benjamin Smith, Glasgow (GB); Nathan Alan Paculba, New Orleans, LA (US); Kevin Grant Munro, Symington (GB); David Ewen Gibson, Winchester (GB)

(73) Assignee: PROSERV UK LIMITED, Aberdeenshire (GB)

( * ) Notice: Subject to any disclaimer, the term of this patent is extended or adjusted under 35 U.S.C. 154(b) by 0 days.

(21) Appl. No.: 14/722,657

(22) Filed: May 27, 2015

(65) Prior Publication Data

US 2015/0343558 A1  Dec. 3, 2015

(30) Foreign Application Priority Data

May 27, 2014  (GB) .................................. 1409344.7

(51) Int. Cl.
*B23K 20/12* (2006.01)
*B23K 20/14* (2006.01)
(Continued)

(52) U.S. Cl.
CPC ............. *B23K 20/14* (2013.01); *B23K 20/12* (2013.01); *B23K 20/129* (2013.01); *B23K 31/02* (2013.01); *B23K 37/04* (2013.01)

(58) Field of Classification Search
None
See application file for complete search history.

(56) References Cited

U.S. PATENT DOCUMENTS 3,897,623 A * 8/1975 Tasaki .................... B23K 20/12
                                                                    156/73.5
3,973,712 A * 8/1976 Armstrong ........... B23K 9/0061
                                                                      228/218
(Continued)

FOREIGN PATENT DOCUMENTS

CN          101244485 A  *  8/2008
CN          202934234 U  *  5/2013
(Continued)

OTHER PUBLICATIONS machine translation of CN 101244485 A (no date available).*
UK IPO Search Report for Application No. GB1508930.3 dated Jun. 10, 2015, 2 pages.

*Primary Examiner* — Kiley Stoner
(74) *Attorney, Agent, or Firm* — Drinker Biddle & Reath LLP (57) ABSTRACT

A subsea friction welding apparatus comprises a chuck for supporting and retaining a weld item prior to welding the weld item to a work-piece, said chuck comprises a plurality of jaws having an internal profile to grip a corresponding profiled surface on the weld item and means for radially expanding the internal profile of the jaws of the chuck, said means actuable by axial insertion of the weld item into the chuck thereby avoiding relative rotation of the chuck and the weld item during insertion of the weld item into the chuck. In operation of the method, a supply of weld items and a weld head are deployed to a subsea location and the weld items are loaded via ROV into the weld head at the subsea location.

8 Claims, 8 Drawing Sheets

(51) Int. Cl.
*B23K 37/04* (2006.01)
*B23K 31/02* (2006.01)

(56) References Cited

U.S. PATENT DOCUMENTS

| | | | | |
|---|---|---|---|---|
| 4,139,758 | A * | 2/1979 | Pinfold | B23K 9/0061 219/137 WM |
| 4,451,723 | A * | 5/1984 | Gres | B23K 9/201 219/72 |
| 5,469,617 | A * | 11/1995 | Thomas | B23K 20/1215 164/108 |
| 6,269,763 | B1 * | 8/2001 | Woodland | A62C 29/00 114/144 A |
| 6,880,743 | B1 * | 4/2005 | Coletta | B23K 20/1295 228/112.1 |
| 2001/0017292 | A1 * | 8/2001 | Belloni | B23K 9/0286 219/125.11 |
| 2002/0125297 | A1 * | 9/2002 | Stol | B21J 15/027 228/112.1 |
| 2005/0061853 | A1 * | 3/2005 | Packer | B23K 20/123 228/112.1 |
| 2009/0294514 | A1 * | 12/2009 | Babb | B23K 20/126 228/112.1 |
| 2010/0065532 | A1 * | 3/2010 | Champney | B23K 9/0061 219/74 |
| 2010/0139077 | A1 * | 6/2010 | Linzell | B23K 20/12 29/525 |
| 2010/0159265 | A1 * | 6/2010 | Fairchild | B23K 9/0282 428/586 |
| 2011/0127311 | A1 * | 6/2011 | Peterson | B23K 20/126 228/2.1 |
| 2011/0240374 | A1 * | 10/2011 | Davis | B23K 20/1275 175/284 |
| 2012/0160363 | A1 * | 6/2012 | Jin | C22C 38/04 138/177 |

FOREIGN PATENT DOCUMENTS

| | | | | |
|---|---|---|---|---|
| CN | 103212780 A | * | 7/2013 | |
| CN | 103223552 A | * | 7/2013 | |
| CN | 103302396 A | | 9/2013 | |
| GB | 1451447 | | 10/1976 | |
| GB | 2526700 A | * | 12/2015 | B23K 20/129 |
| JP | 2004082194 A | * | 3/2004 | |

* cited by examiner

SUBSEA WELDING APPARATUS AND METHOD

FIELD OF THE INVENTION

This invention relates to a welding apparatus and method and more specifically to a subsea friction welding apparatus and a method of subsea friction welding.

BACKGROUND

Friction welding is a solid-state (no melting of materials) welding process that produces a fine grain forged weld by using the heat generated between a rotating weld item under an axial load and a fixed work-piece. Heat for welding is generated by direct conversion of mechanical energy to thermal energy at the interface of the work pieces without the need for the application of electrical energy or heat from other sources.

Therefore, friction welding produces high quality welds and can be performed at temperatures below the melting point of the metals that are being bonded together. The temperature is not high enough for a liquid weld pool to form from the two component materials which also facilitates welding of dissimilar metals which may be difficult to weld by higher temperature processes such as electric arc welding.

A weld item may typically be a metal stud or plug, which may be substantially cylindrical or tapered in shape and may have an external thread or part thereof. The weld item is rotated at high speed which depends on the diameter of the weld item but is typically around 1000-10,000 rpm and forced onto a static metallic component or work-piece. Friction from the contact between the rotating metal weld item and the fixed metal component generates heat. As the temperature between the interface of the weld item and the static component increases, the strength of the metals at the interface is reduced and the materials of the weld item and the static component will flow plastically under pressure from the applied force as the temperature reaches around 700-800 degrees Celsius.

Weld items are not limited to solid cylindrical forms and may for example be hollow or tubular such as a weld nipple, and may have a polygonal external profile such as a hexagon for example. The term weld item or weld stud used throughout this description is intended to cover all such forms.

In order to carry out a friction welding operation subsea, underwater welding tools have been developed and the weld items are typically fitted with a shroud formed of an anti-quenching material, which may be a material such as a foam, which fits over the weld item and seals between the weld item and work-piece preventing the weld from being cooled rapidly by the surrounding water.

A weld item and an anti-quenching foam shroud is typically manually inserted in conjunction with the weld item, into the chuck of the welding tool at the surface or topside prior to the welding tool being carried by an ROV to the weld site. As noted above, the foam shroud acts as a barrier between the weld and the surrounding seawater, reducing the quenching of the weld from the cold water. Manually installing the weld stud and foam shroud at the surface is a difficult and time consuming operation. The weld stud which is typically threaded, is wound into a threaded chuck on the welding apparatus.

During transit of the ROV to the weld site there is a danger that the foam shroud may be dislodged or damaged such as when transiting through the splashzone from the surface to the weld site. The foam type shrouds can limit the friction welding depth due to issues with compressibility at depth which can compromise the anti-quench functionality of the shroud and could lead to an incomplete weld or failure of the weld operation using the loaded weld item. In the event that the ROV reaches the weld site and the foam shroud is compromised, it is necessary for the ROV to return to the surface and for the damaged or dislodged foam shroud to be removed and a replacement weld item, with a fresh anti-quench foam shroud, to be loaded onto the chuck of the welding tool and the ROV to transit back to the weld site, which adds time and costs to the welding operation and further risks of displacement or damage to the weld items during the repeated transits.

A control system is typically deployed to the weld site separately from the welding head which adds to the complexity of the operation and provides additional risks to the success of the operation should the control system fail or be damaged during transit.

Operating depths may be limited due to subsea currents effecting the position of the control system (deployed by wire) relative to the ROV position.

Once at the required subsea location, the ROV locates the weld head with the weld item and surrounding foam shroud into a weld clamp which is typically attached to the work-piece temporarily via mechanical clamping, suction cups or magnets. The subsea friction weld is then carried out under command instructions from the surface for example under control signals supplied by a control wire between the surface and the welding apparatus.

Completed friction welds can then be checked by carrying out a pull test where a tensile force is applied to the weld item from the weld head.

After the weld item is successfully friction welded to the work-piece, the weld head typically winds off the chuck from the threaded stud by reversing the direction of rotation of the weld head which allows the threaded portion of the weld item and the threaded chuck of the weld head to disengage. This winding off operation can damage the threads of the stud.

The weld head is then disengaged from the weld clamp and the ROV is recovered to the surface where the next weld stud and protective foam shroud is loaded before the ROV returns to the weld site for the next stud to be welded.

The present invention aims to provide a welding apparatus and method that enables the welding of consecutive weld items at the required subsea location with an increased operating depth without having to recover the welding apparatus to the surface between welds.

SUMMARY OF INVENTION

According to one aspect of the present invention there is provided a method of subsea friction welding, comprising the steps of deploying a supply of weld items to the subsea location where the friction welding operation is to be carried out, mounting a friction weld head to a remotely operated vehicle (ROV) and deploying the ROV to the subsea location, operating the ROV to hold, carry, position and orientate the friction weld head and operating the ROV to load weld items into the friction weld head at the subsea location for welding each weld item to a work-piece.

Preferably the method further comprises the steps of isolating the friction weld location on the work-piece from the surrounding environment and purging the isolated weld location of surrounding seawater.

The present invention provides a remotely operated subsea friction welding method which facilitates the welding of consecutive weld items within the subsea environment without requiring the ROV to return to the surface. This obviates the need for the ROV to pass through the splash zone on the way to and in returning from the surface which adds time, cost and risk to the friction welding operation.

By isolating the weld location on the work-piece from the surrounding environment, and purging the weld location of seawater and replacing the seawater with a medium which is conducive to decreasing the quench rate of the weld, the weld hardness value can be influenced and this also eliminates the need for a foam shroud surrounding the weld item which allows for high quality friction welds to be carried out at greater depths than has previously been achievable.

Advantageously the method further includes the step of operating the ROV to connect the friction weld head into a weld clamp mounted on the work-piece.

Advantageously the method further includes the step of mounting a weld receptacle to the weld clamp over the weld location on the work-piece to isolate the weld location from the surrounding sea water within a chamber of the weld receptacle which is formed when the weld head is engaged into the weld receptacle thereby creating a space between the work-piece, the weld clamp and the weld head.

Preferably a medium is introduced and more preferably forced under pressure into the chamber to displace the surrounding water from the weld location.

Advantageously the medium comprises an inert gas or a gel or a liquid.

Preferably Nitrogen, Helium or Argon is forced into the isolated weld location.

Conveniently the weld receptacle is coupled to the weld head to encapsulate a loaded weld item.

Conveniently the weld item is friction welded to the work-piece at the weld location through the purged chamber of the receptacle.

According to a further aspect of the present invention there is provided a subsea friction welding apparatus comprising a chuck for supporting and retaining a weld item prior to welding the weld item to a work-piece, said chuck comprising a plurality of jaws having an internal profile to grip a corresponding profiled surface on the weld item and means for radially expanding the internal profile of the jaws of the chuck, said means actuable by axial insertion of the weld item into the chuck thereby avoiding relative rotation of the chuck and the stud during insertion of the weld item into the chuck.

Advantageously at least a portion of the internal profile of the jaws is threaded.

Advantageously the apparatus further comprises means for isolating a weld location at which the weld item is to be friction welded to the workpiece from the surrounding seawater.

Conveniently the apparatus further comprises means for purging seawater from the isolated friction weld location.

Advantageously the apparatus comprises an actuation member which can be selectively operated to radially contract or expand the internal profile of the jaws of the chuck. Preferably the actuation member is operated to radially contract the profile of the jaws of the chuck.

Advantageously biasing means may be provided to force the actuation member towards the rest position in which the internal profile of the jaws are in the expanded condition.

Optionally the biasing means may comprise a spring.

Alternatively the biasing means may be provided to force the actuation member towards the operative position.

Preferably said actuation member is a collar mounted around the outer surface of the chuck.

Advantageously said collar is axially displaceable with respect to the chuck.

Conveniently the jaws are radially displaceable to alter the internal profile of the chuck. Most preferably the jaws are radially displaceable to alter the internal size of the chuck.

Advantageously further biasing means are provided to bias the jaws of the chuck into the contracted condition.

Preferably the further biasing means comprise one or more garter springs surrounding the jaws of the chuck.

Advantageously the isolating means comprises a weld receptacle having an internal chamber which can be located on or adjacent to the workpiece at the weld location.

Preferably the chuck of the weld head can be located and sealed within the isolating means such that a weld item retained in the chuck is welded to the work piece through the receptacle of the isolation means.

BRIEF DESCRIPTION OF THE DRAWINGS

Embodiments of the present invention will now be described with reference to and as shown in the accompanying drawings in which.

DETAILED DESCRIPTION OF THE EMBODIMENTS

Figure 1:
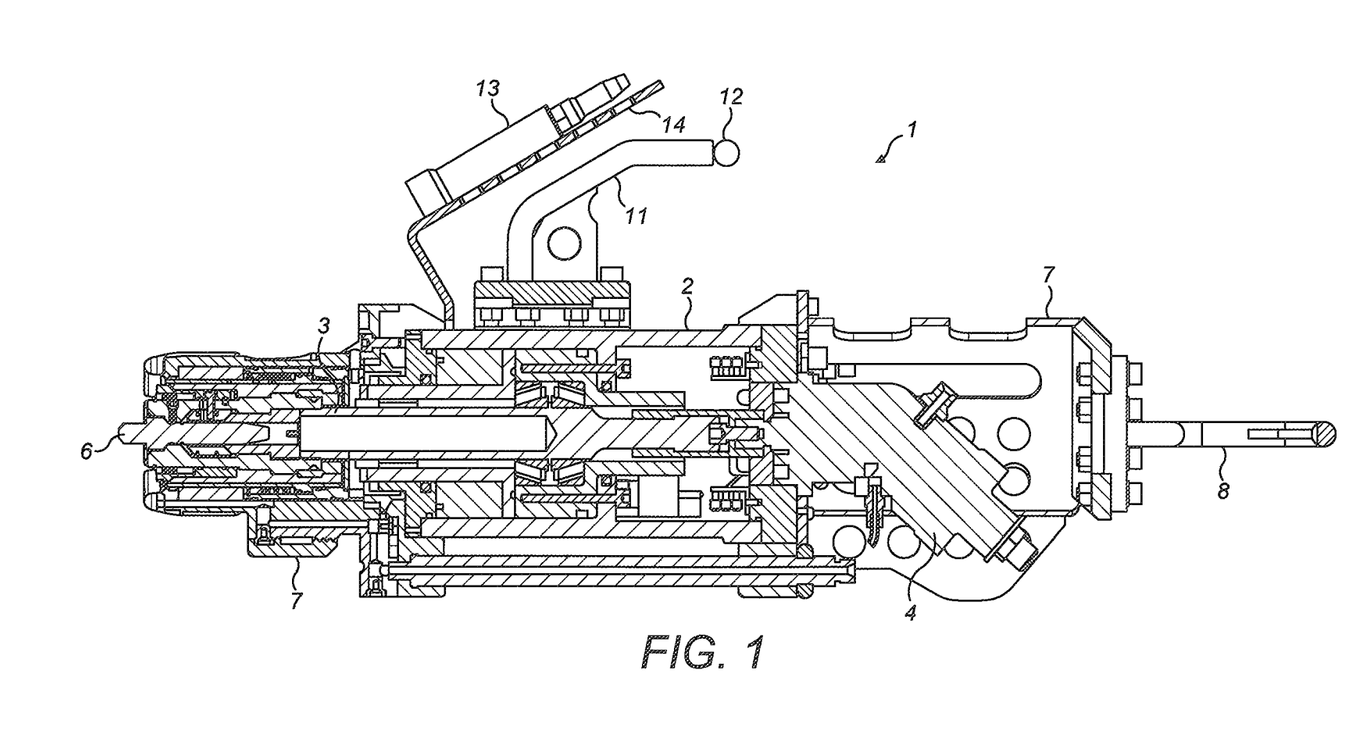
FIG. 1 is a sectioned view of a subsea friction welding apparatus according to one aspect of the present invention.
Figure 2:
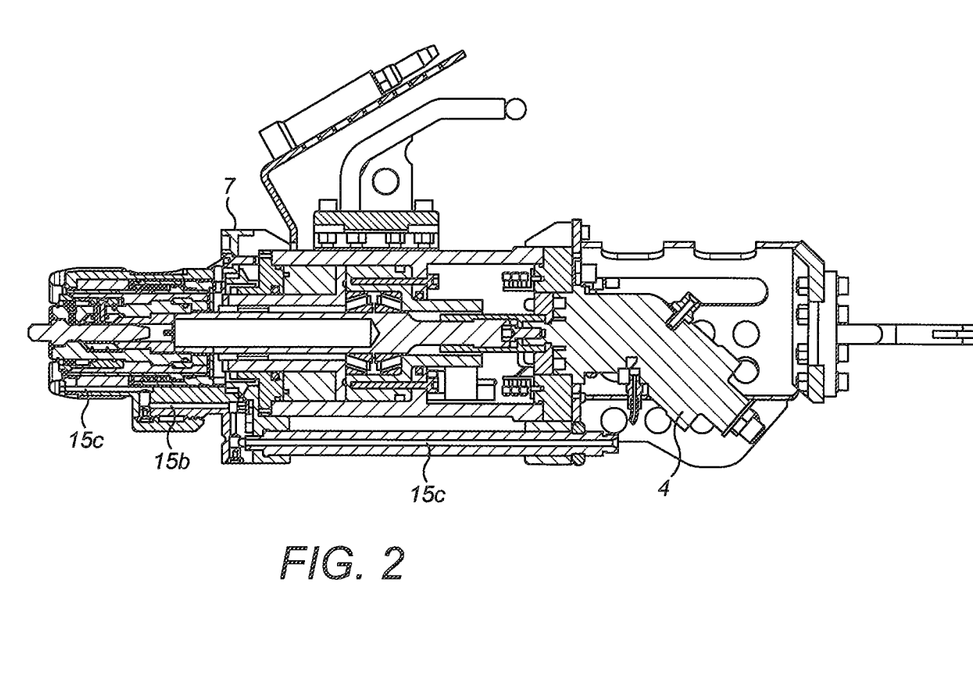
FIG. 2 is a section view of the subsea friction welding apparatus of claim 1 approaching a weld receptacle.
Figure 8:
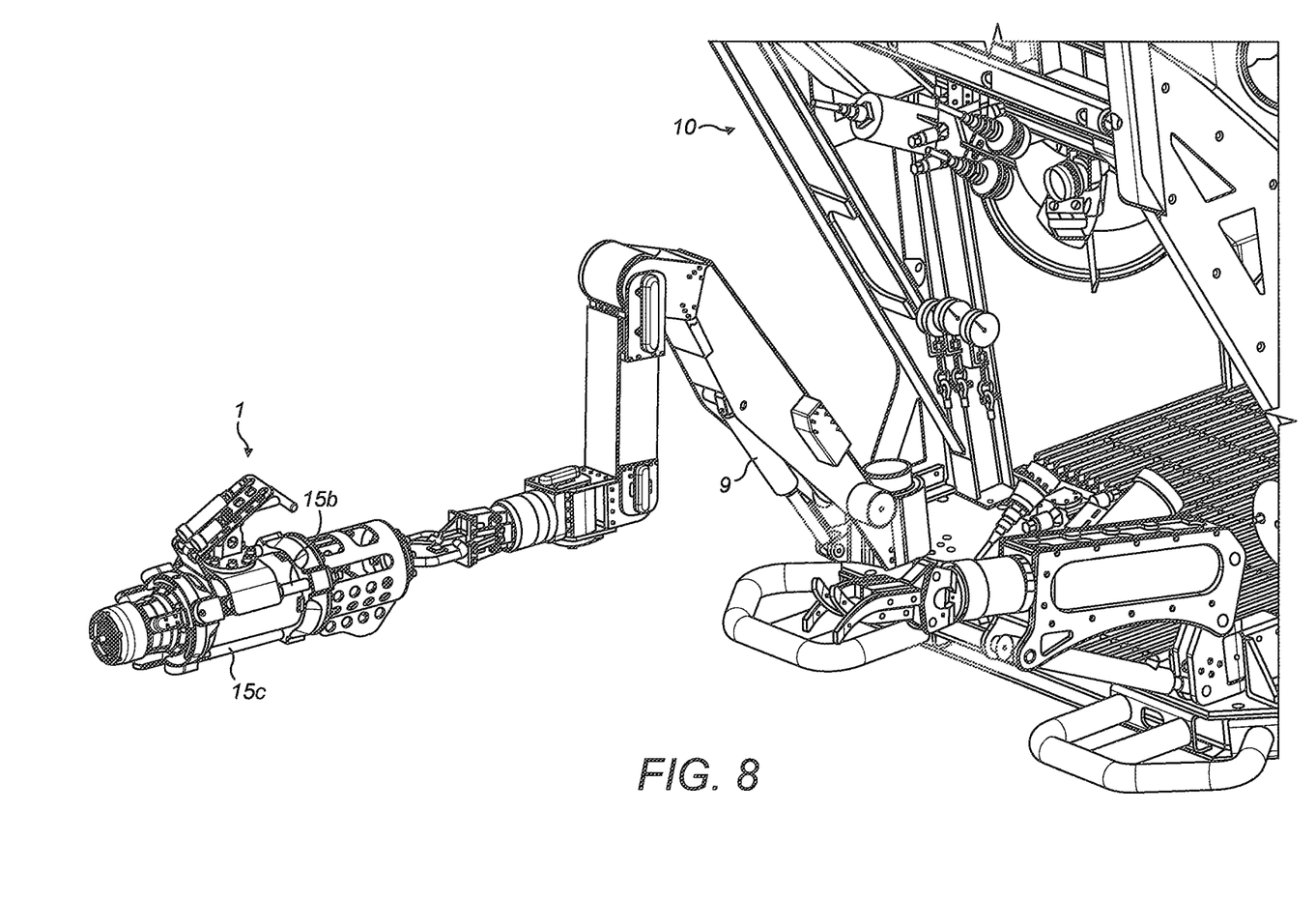
FIG. 8 shows a schematic view of a manipulator arm of an ROV directing the welding apparatus of FIG. 1.

FIGS. 1 and 2 show sectioned views of a subsea friction welding apparatus 1 according to one aspect of the present invention. The apparatus comprises a friction weld head 2 with a chuck interface at a nose end 3 of weld head and a motor 4 at the other. The nose end of the weld head comprises a chuck 5 adapted to securely retain a weld item 6 prior to welding (see FIG. 4). A remote welding jacket 7 surrounds the weld head 2 and chuck 5 of the apparatus. The welding jacket is a body or frame which surrounds the weld head and protects the weld head from the environment without restricting the operation of the weld head whilst facilitating power and control lines to be connected to the weld head. In the embodiment shown, a handle 8 is provided on the end of the remote weld jacket to allow the welding apparatus to be grasped by and manipulated by a manipulator arm 9 of an ROV 10 as shown in FIG. 8 as will be described further below.

A second handle 11 may be mounted on the outer surface of the remote welding jacket 7 to provide an alternative grasping option for the ROV. In the embodiment shown the handles are bolted to the apparatus, the handle 8 on the end of the jacket extends axially from the jacket and is substantially D-shaped or torroidal in form. The handle 11 mounted on the outer surface of the welding jacket extends above the weld head and terminates in a T-bar grasping portion 12 (as will be further described below.

A camera 13 for inspection of the welding operation may be mounted on the welding apparatus and in this embodiment is shown mounted on the welding jacket on a bracket 14 which is fixed to the body slightly forward of the second handle. The orientation of the bracket may be adjusted to adjust the view of the camera. This may be controlled remotely from a surface based operation.

Figure 3:
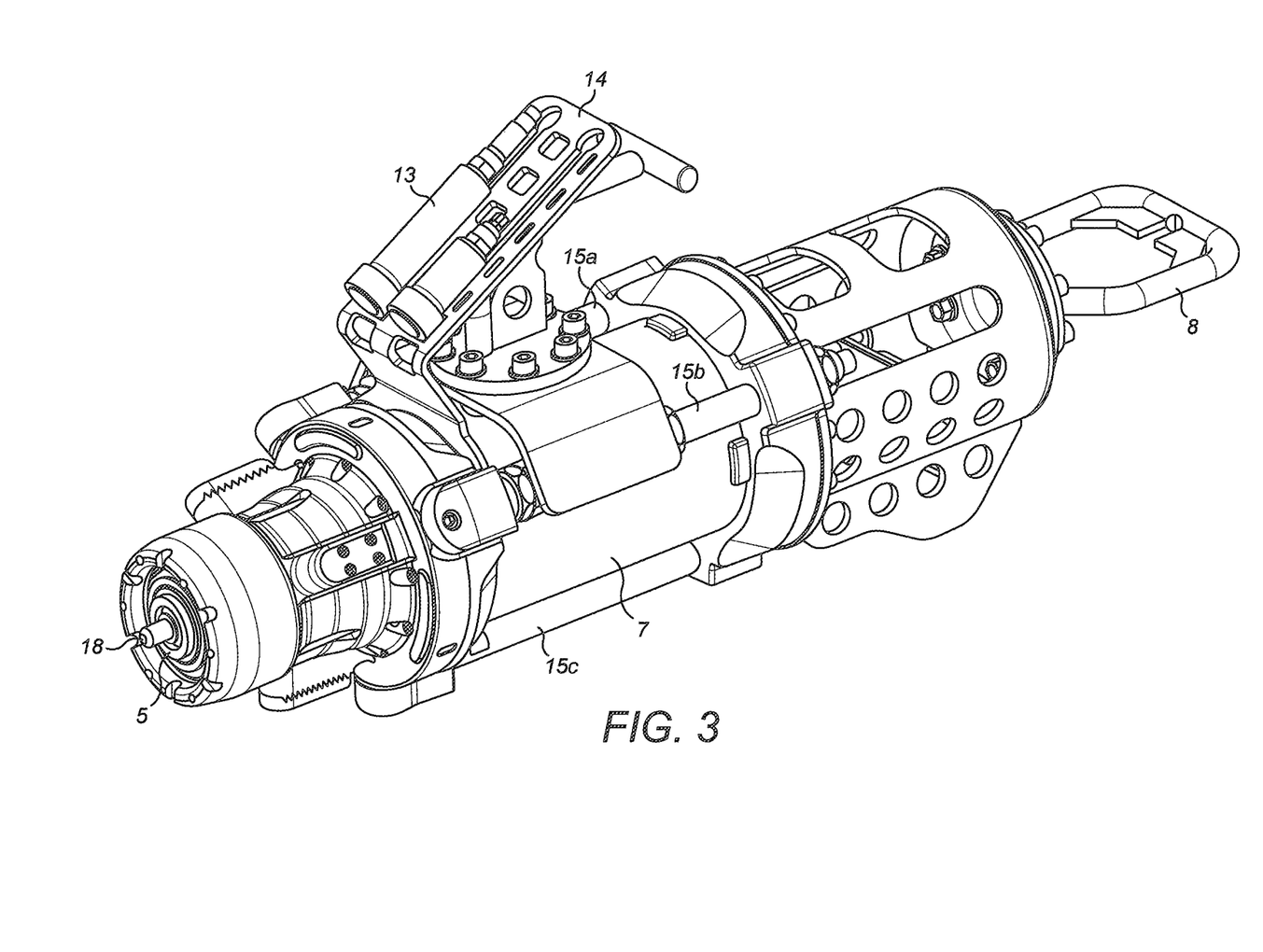
FIG. 3 is a perspective view of the apparatus of FIG. 1 with the remote welding jacket retaining the weld head.
Figure 7:
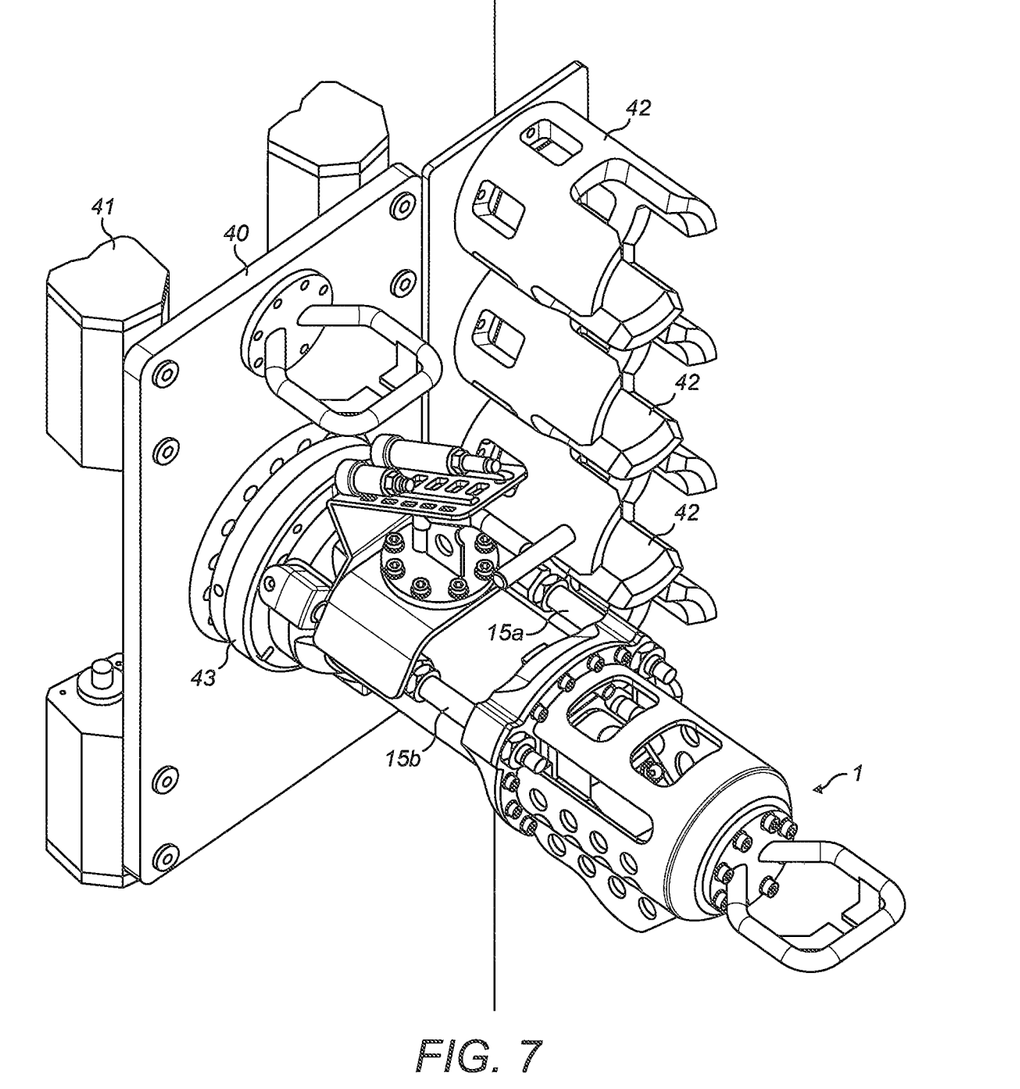
FIG. 7 shows a schematic view of the apparatus of FIG. 1 engaged with a weld receptacle against a workpiece with a supply of weld items arranged adjacent to a subsea work site.

Fluid channels 15a, 15b and 15c are provided through the jacket as can be seen in FIGS. 3 and 7.

Figure 4:
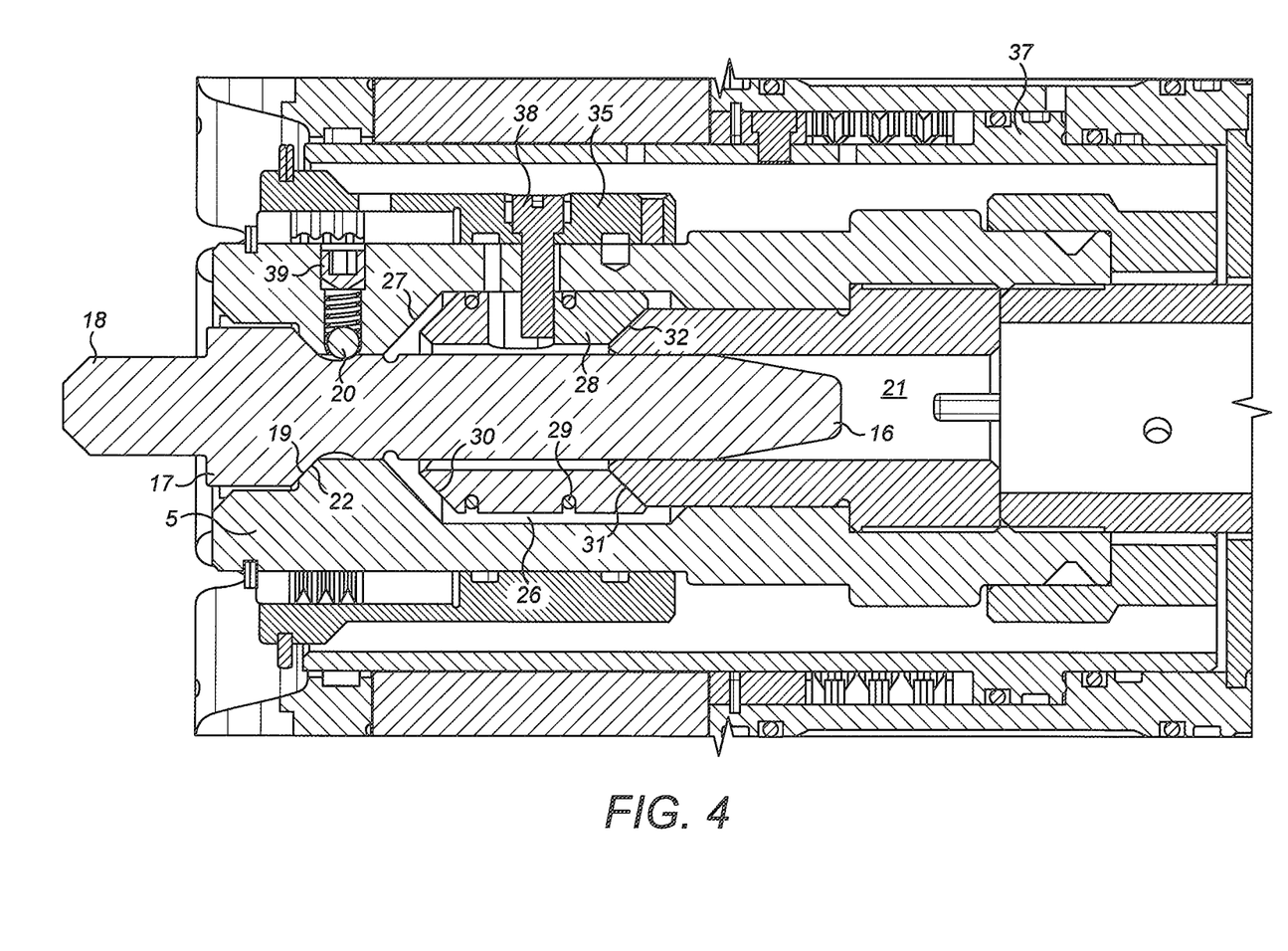
FIG. 4 is an enlarged sectioned view of a chuck of the weld head of FIG. 1 lightly gripping a weld item with an actuating member in the rest position.

FIG. 4 is a schematic cross sectional view through the weld head 2 with a weld item 6 loaded into the chuck 5 at the nose end 3 of the weld head.

A weld item is typically an elongated metal element such as a solid stud. In this embodiment, the stud is substantially cylindrical. One end of the stud 16 is tapered to facilitate easy interface and insertion into the chuck 5 of the weld head. The other end of the stud has a flange 17 defined by a region of increased thickness of the stud slightly spaced from the workpiece end of the stud 18. The region of increased thickness may form a polygonal profile and may be used to transmit torque between the chuck and the stud.

The flange 17 may be integrally formed with the stud or may be provided by a collar or bolt mounted externally on the stud. In the embodiment shown, a tapered shoulder region 19 is provided on the side of the flange facing the tapered end of the stud 16 which abuts the chuck when the stud is inserted into the weld head. This provides a flat or conical surface to allow compressive forces to be transmitted between the weld item and the chuck.

The stud has a region of reduced thickness 20 immediately behind the tapered should region.

The main body of the stud between the region of reduced thickness and the tapered end in this embodiment is threaded.

As mentioned above, the welding apparatus comprises a chuck 5 for supporting and retaining the stud 6 prior to friction welding to the work piece. The chuck comprises a body having an axial bore 21 for receiving a stud. The body of the chuck has an inner tapering shoulder region 22 which substantially matches the taper of the tapered shoulder 19 of the flange of the stud. This provides a first conical surface within the chuck. As shown in detail in FIGS. 4 and 5, a ball and detent feature is provided for lightly retaining the stud in the chuck. In the embodiment shown, a plurality of radial bores 23 is formed through the body of the chuck behind the tapered shoulder 22 and a ball 24 is mounted within each radial bore and biased towards the stud by a spring 25 or other biasing member mounted in the bore behind the ball. When the stud is inserted in the chuck, the balls sit within the waist region of the stud to lightly retain the stud in the correct position within the chuck as further described below. Three such ball and detent features may be provided around the body of the chuck.

An internal recess 26 is formed in the body of the chuck behind the retaining ball members. The internal recess has a tapered surface 27 at the forward end of the recess remote from the nose of the weld head.

The chuck comprises a plurality of jaws 28 which form a segmented collar retained together by one or more garter springs 29 which bias the jaws inwardly to a closed position but allows the jaws to expand radially, against the spring force to allow a weld item to be inserted into the chuck and then radially contract to retain the weld item within the weld head and hold the weld item securely in position.

The jaws 28 of the chuck are mounted onto the nose 4 of the weld head remote from the motor. The internal surface of the jaws may be profiled to match the outer profile of the weld item.

The radially expandable jaws 28 of the chuck are mounted within the recess 26 and can move axially within the recess to alter the internal profile of the jaws. The leading surface 30 of the jaws have a tapered profile which matches the tapered forward end 27 of the recess as mentioned further below.

The inner surface of the jaws of the chuck may be threaded with a pitch corresponding to the thread on the outer surface of the main body of the weld item.

The rear surface 31 of the jaws of the chuck has an internally tapered or conical surface and the rear portion 32 of the body of the chuck beyond the recess has a cooperating tapered or conical surface which substantially matches the surface at the rear of the jaws of the chuck and operates as an actuating surface for the jaws.

Figure 6:
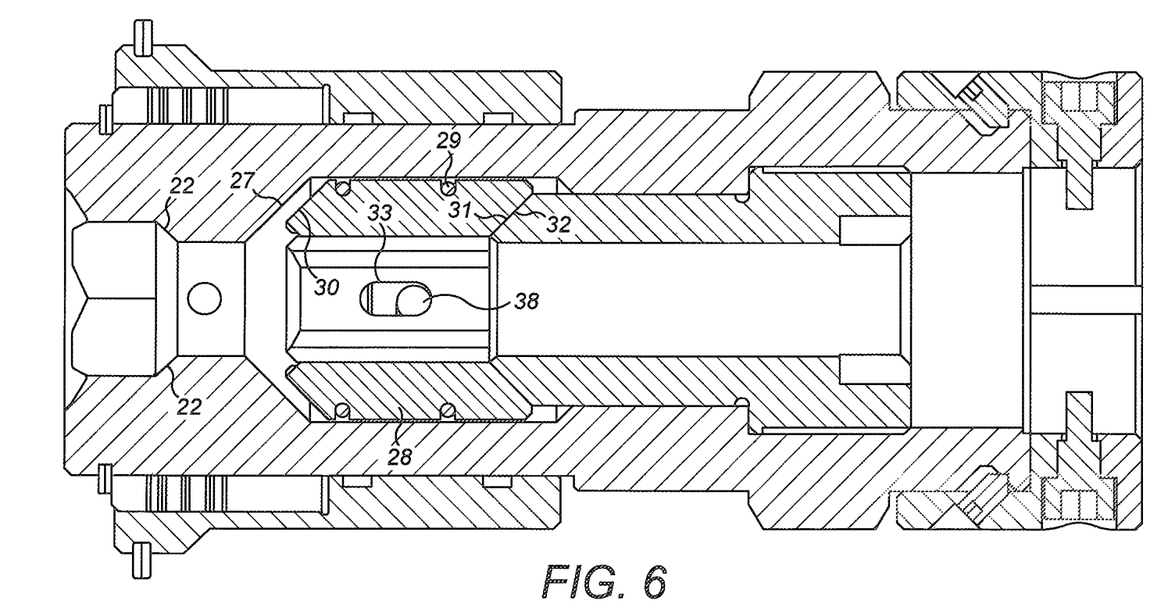
FIG. 6 is an enlarged sectioned view of the chuck of FIG. 4 showing the detail of the connection between the actuating member and the jaws of the chuck.

As shown in FIG. 6, each jaw of the chuck has an axial slot 33 provided through the centre of the jaw.

An actuation means 34 is provided on the remote welding jacket 7 for moving the radially expandable jaws 28 of the chuck between an open or unlocked position and a closed or locked position. In the open position, the jaws 28 of the chuck are held at the rear of the recess 26 against the actuation surface 32 of the body of the chuck which forces the jaws radially apart and holds the jaws open against the force of the garter springs. In the closed position the jaws are released from the actuation surface 32 and forced radially inwards by the garter springs such that the internal profile of the jaws is engaged with and firmly grips the outer profile of the stud. In the present embodiment where the outer surface of the stud is threaded and the inner surface of the jaws has a cooperating thread, in the closed or locked position, the threads of the inner surface of the jaws engage with the threads of the outer surface of the stud.

The actuation means comprises a sleeve 35 which surrounds the chuck. A force transmission member is mounted on the forward end of the sleeve. In this embodiment the force transmission member is a circlip 36. A piston 37 is provided for moving the sleeve axially along the chuck. The piston is operated via hydraulic fluid introduced to the hydraulic line 15a.

In the embodiment shown, a plurality of radial pins 38 are mounted to the actuation sleeve 35 Each of the radial pins 38 extends from the sleeve into the axial slot 33 in the jaw 28 of the chuck and operatively connects the actuation sleeve 35 to a jaws of the chuck.

The actuation sleeve is spring loaded such that it is biased into the open (unactuated position) with the jaws 28 of the chuck held open at the rear of the recess on the actuation surface. A spring 39 is mounted between the chuck body 6 and the actuation sleeve 35.

When the actuation sleeve is in the open position shown in FIG. 4 the radial pins 38 sit at the rear of the axial slot 33 in the jaws and prevent the jaws from moving forward away from the actuation surface.

Figure 5:
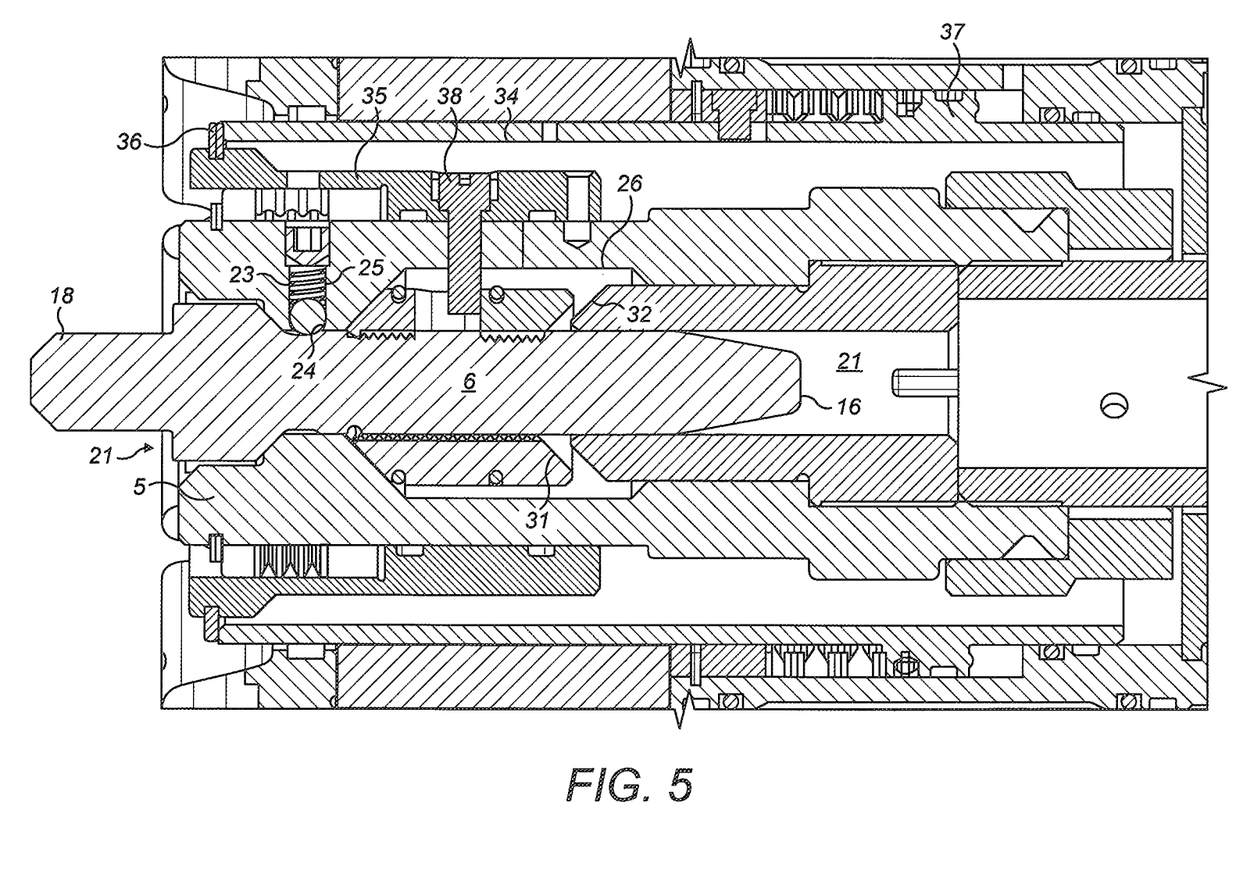
FIG. 5 is an enlarged sectioned view of the chuck of FIG. 4 with the actuating member in the actuated position.

As the actuation sleeve moves towards forwards within the chuck to the closed (actuated) position, the radial pins move forward within the axial slots 33 and allow the jaws 28 to contract under the force from the garter springs which allows the jaws to move forward to the position shown in FIG. 5 and the threads of the jaws engage the threads of the stud. With the thread engaged, if the weld item was then pulled it would draw the segments/jaws into the front side tapered/conical surface which forces them to close even tighter.

The apparatus also includes a purge system to evacuate water surrounding a loaded stud prior to welding of the stud to the work-piece. Fluid line 15*b* is provided through the weld jacket and opens at the forward end of the apparatus adjacent to the chuck 6. A pressurised supply of fluid for example located at the surface or alternatively on the ROV, can be connected to the fluid line to allow fluid to be selectively forced through the fluid line and ejected from the forward end of the chuck. Preferably the fluid is an inert gas.

Bleed line 15*c* is provided through the jacket from the forward end of the apparatus to allow water surrounding the stud to be evacuated from the immediate work area as will be described further below. The bleed line may exit the welding jacket 7 at the back of the jacket remote from the chuck and may comprise a sensor to detect the fluid flowing in the bleed line and a check valve to prevent surrounding water from re-entering the bleed line.

In order to carry out a subsea friction welding operation, a stock of weld items 6 are deployed to the weld site (FIG. 7) and deposited in a location adjacent to the metal structure upon which the welding operation is to be carried out.

The weld head 2 is mounted to an ROV 10 at the surface and the ROV is operated to deploy the welding apparatus 1 to the weld site. In some embodiments the stock of weld items may be mounted on the ROV with the weld head. For example the weld items may be provided on a tray of the ROV within reach of the manipulator arm 9. A weld clamp 40 may be deployed on the ROV and may be attached to a work piece via magnets 41 or other temporary connectors and then recovered by and moved from location to location by the ROV.

The articulated manipulator arm 9 of the ROV can grip the welding jacket 7 using either the handle 8 provided at the back of the weld head on the frame or by the second handle 11 on the main body of the welding jacket or the weld head may be stowed in a storage pocket or similar on the ROV, reachable by the manipulator arm.

The ROV flies the weld head to the required welding site.

The weld studs 6 are each housed within a receptacle 42 which can interface with the nose of the welding jacket 7 as described below to allow the studs to be remotely loaded into the chuck of the weld head.

The actuation means 34 of the chuck is activated by forcing hydraulic fluid through the fluid line 15*a* thereby pushing piston 37 forward which in turn moves the actuation sleeve 35 forwards towards the nose 4 of the remote weld head against the spring bias 39. This pulls the radial pins 38 forward in the axial slots 33 of the jaws and thus allows the jaws to contract radially inwards under influence of the garter springs 29.

With the actuation member in the activated condition, the ROV manoeuvres the weld head to pick a stud out of its receptacle.

As the nose end 3 of the remote welding jacket approaches the tapered end 16 of the stud the nose of the welding jacket enters the weld receptacle 42 which sits over the nose of the welding jacket and the stud extends into the axial bore 21 of the chuck. The tapered end of the weld stud enters the chuck 5 and passes the ball 24, forcing the ball into the radial bore 23 against the spring bias 25.

With the radially expandable jaws 28 of the chuck in the contracted or closed position, the stud can slide into the chuck and force the radially expandable jaws outwardly against the garter springs 29 to accommodate the threaded outer surface of the stud without requiring relative rotational movement of the stud and the chuck. The jaws of the chuck are retained by the garter spring 29 and contract onto the stud engaging the threads. As the flat or conical surface 19 of the flange of the stud reaches the corresponding flat or conical surface 22 of the internal profile of the chuck the stud is fully inserted into the chuck. In this position, the waist 20 of the stud is aligned with the opening of the bores 23 through the chuck and the balls are forced out of the bore by the spring 25 and are retained between the waist of the stud and the spring 25 thus holding the stud in position even if the actuation means 34 were to be unintentionally deactivated and the radially expandable jaws were to move to the unlocked position rather than risking the stud falling out potentially resulting in loss of or damage to the stud.

In the embodiment shown the engagement between the cooperating conical tapered surface of the chuck 22 and the stud 19 allows the chuck to locate the stud axially and transmit compressive forces to the stud. This reduces the contact pressure between the stud and the chuck and therefore decreases the chance of damage to either item during the welding operation. In alternative embodiments the tapered conical surface may be replaced by flat shoulders on the stud and the chuck.

Once the stud is loaded into the weld head the ROV flies the apparatus to a weld collar 43 which will previously have been located subsea within a reaction clamp 40 within which the friction weld operation will be carried out.

FIG. 2 shows the weld head 2 within the remote welding jacket 7 with a loaded stud 6 in the chuck 5 moving towards a weld collar 43.

The engagement between the welding jacket and the weld collar 43 may be a bayonet style fitting with a radial pin or lug extending from the outer surface of the remote welding jacket and a slot or detent provided internally within the weld collar.

With the remote weld jacket (and associated weld head complete with the chuck holding a weld stud), engaged with the weld collar 43, a sealed chamber 44 is produced bounded by the workpiece, weld collar 43 and the remote welding jacket 7. Seals 45 are provided at the work-piece side of the weld collar 43 to prevent sea water from leaking into the chamber 44.

A medium such as for example an inert gas like Nitrogen, Helium or Argon is delivered through the fluid line 15*b* on the remote welding jacket 7 into the chamber which displaces sea water in the chamber. The sea water is evacuated through the bleed line 15*c* of the purging system. The water sensor within the bleed line indicates when the chamber has been fully evacuated of water or if water is leaking into the bleed line. The gas purging operation is carried out remotely under control from an operator at the surface.

The purge medium is selected to decrease the quench rate of the weld and improve or make more favourable the weld hardness values and may, in some embodiments be an alternative inert gas, a liquid or gel.

Once the chamber is purged of sea water and filled with the purge media, the weld head 2 is operated by the ROV to rotate the chuck 5 and weld stud 6 at high speeds to friction weld the stud to the workpiece in accordance with conventional friction welding operations. Purging may keep commencing during welding if required.

During the subsea friction welding operation, the actuation sleeve 35 will generally be deactivated by stopping the flow of hydraulic fluid to the piston 37 which allows the activation sleeve to return to the rest position and the jaws 28 of the chuck to return to the open position. During welding, there is no need to lock the jaws of the chuck to the weld stud.

Tensile loads are transmitted from the weld head to the stud through the threaded engagement between the chuck jaws and the threaded outer surface of the body of the stud.

A pull test can then be carried out on the welded stud as before in which case, the sleeve 35 is first actuated to close the jaws 28 to grip the stud, allowing the weld head to apply a tensile load to the stud while monitoring its position to check weld integrity.

Thereafter the ROV 10 maneuvers and manipulates the welding jacket to disengage from the weld collar 43 and then maneuvers the welding jacket to pick up the next weld stud which is loaded into the weld head remotely at the subsea location adjacent to the work site.

The purge system, the purge medium and the related control systems for purging sea water from the isolated weld site, may be mounted on and deployed with the ROV with remote control capabilities for these systems provided at the surface. The fluid lines delivering the purge medium to the weld head may be connected while the weld head is being mounted onto the ROV.

The method of the present invention provides for multiple weld items such as weld studs to be friction welded subsea without the need for the ROV to depart the weld site and transit back to the surface, through the splashzone between each successive weld which leads to a saving of time and cost in relation to each welding operation whilst reducing the risk of failure of the equipment particularly due to damage occurring while the ROV passes through the splashzone. In depths of around 3000 m it can take the ROV 1 hour to transit to the surface before returning back to the weld location with a further stud inserted.

Typically the weld head will be deployed from the surface with a weld stud loaded in the chuck and subsequent weld studs will be loaded remotely into the chuck as described above.

The weld stud geometry as described above enables easier loading of the weld studs at the weld site and allows for the transmission of torque, forge force and tensile loads from the chuck of the weld head to the workpiece.

In the embodiments described above, the weld stud can be inserted into the weld head by axial movement only even when the expandable jaws are in the contracted position as the jaws of the chuck can move radially outwardly to accommodate the threaded portion of the weld stud. In the event of a failure situation such as a loss of power or a loss of pressure to the actuating sleeve 35, the actuating sleeve will return under the spring biasing force to the rest position and the jaws of the chuck will move from the contracted to the expanded position thereby releasing the stud to enable an easier recovery of the system that would not previously have been possible. This provides a reliable failsafe feature for the weld head and in this condition the stud will be lightly retained by ball detent feature but can be pulled out under applied force, such as by hand.

In the event that it is necessary to have the chuck remain in the locked position upon such a pressure or power loss, then in an alternative arrangement the chuck may be configured to require actuation to open rather than actuation to close or lock as required.

The present invention provides for quick, simple and effective loading of weld items into the weld head chuck which provides for facilitating successive weld items to be welded to the workpiece in a timely and cost efficient manner without requiring manual insertion and removal of weld items through relative rotation of the chuck and the weld item.

The embodiments of the invention have been described for use in sea water but it will be apparent to the skilled person that any references to sea water will also include fresh water as the invention could similarly be used in fresh water applications.

The invention claimed is:

1. A method of subsea friction welding, comprising the steps of deploying a supply of weld items housed within weld receptacles to the subsea location where the friction welding operation is to be carried out, mounting a friction weld head to a remotely operated vehicle (ROV) and deploying the ROV to the subsea location, operating the ROV to hold, carry, position and orientate the friction weld head coupling a weld receptacle to the weld head to encapsulate a loaded weld item and operating the ROV to load weld items into the friction weld head at the subsea location for welding each weld item to a work-piece.

2. A method according to claim 1, wherein the method further comprises the steps of isolating the friction weld location on the work-piece from the surrounding environment and purging the isolated weld location of surrounding seawater.

3. A method according to claim 1 wherein the method further includes the step of operating the ROV to connect the friction weld head into a weld clamp mounted on the work piece.

4. A method according to claim 3, wherein the method further includes the step of mounting the weld receptacle to the weld clamp over the weld location on the work-piece to isolate the weld location from the surrounding sea water within a chamber of the weld receptacle which is formed when the weld head is engaged into the weld receptacle thereby creating a space between the work-piece, the weld clamp and the weld head.

5. A method according to claim 4, wherein a medium is forced under pressure into the chamber to displace the surrounding water from the weld location.

6. A method according to claim 5, wherein an inert gas, gel or a liquid is forced into the chamber.

7. A method according to claim 6, wherein the inert gas is Nitrogen Helium or Argon.

8. A method according to claim 5, wherein the weld item is friction welded to the work-piece at the weld location through the purged chamber of the receptacle.

* * * * *